United States Patent [19]
Fernandez

[11] 3,838,914
[45] Oct. 1, 1974

[54] EYEGLASS WITH REPLACEABLE LENS
[76] Inventor: Francisco Jose Fernandez, Calle Dr. Vidal, Esq. Antonio Lopez, Box 606, Humacao, P.R. 00661
[22] Filed: June 8, 1973
[21] Appl. No.: 368,017

[52] U.S. Cl. ................................ 351/106, 351/41
[51] Int. Cl. ............................................ G02c 1/02
[58] Field of Search ............ 351/41, 52, 58, 86, 92, 351/106, 154, 21

[56] References Cited
UNITED STATES PATENTS
3,025,761  3/1962  Beasse ................................ 351/52

FOREIGN PATENTS OR APPLICATIONS
915,421  7/1946  France ................................ 351/154

Primary Examiner—Paul A. Sacher
Attorney, Agent, or Firm—Scrivener, Parker, Scrivener & Clarke

[57] ABSTRACT

The frame part and the lens part of a pair of eyeglasses are separable and are releasably held together by the attraction of magnetic means carried, respectively, by the two parts. In certain embodiments of the invention means are provided which supplement the magnetic means to lock the parts in assembled relation.

6 Claims, 7 Drawing Figures

PATENTED OCT 1 1974 3,838,914

EYEGLASS WITH REPLACEABLE LENS

BACKGROUND OF THE INVENTION

There are many situations or conditions in which it would be advantageous to be able to quickly change from one type of eyeglass lens to another, among which may be mentioned a change from clear lenses to colored, or a change from lenses for correcting for myopia to lenses for reading. Heretofore, the necessity for making such changes required that two or more pairs of eyeglasses (spectacles) be carried at all times, resulting in a bulky and unsightly appearance because of the fact that each pair of eyeglasses has not only the lens and frame parts but also the folding temples. It has therefore been desired to provide some means for reducing the bulk of the eyeglasses being carried, while at the same time permitting more than one type of lenses to be carried and selectively used.

SUMMARY OF THE INVENTION

The invention solves this problem by providing a frame part, including folding temples, to which any one of a number of different lens parts may be assembled and releaseably held by magnetic means. In addition, in certain embodiments of the invention means are provided which are additional or supplemental to the magnetic means and which releaseably lock the two parts of the eyeglasses together.

DESCRIPTION OF THE INVENTION

Figure 1:
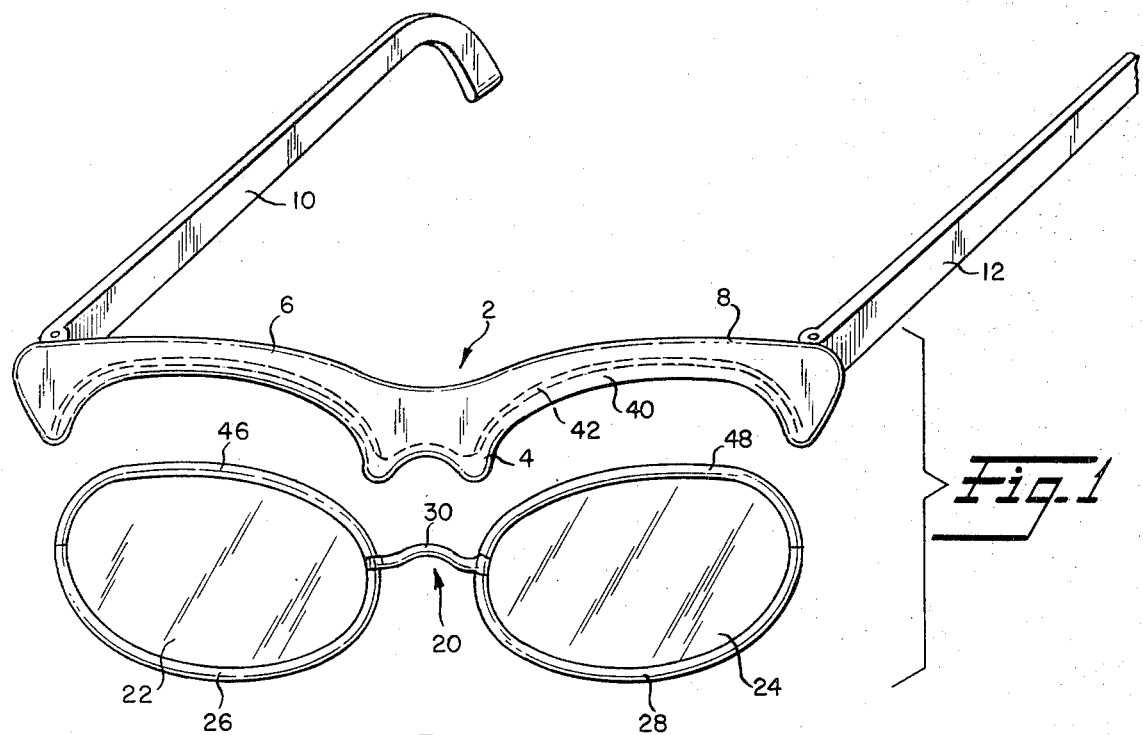
FIG. 1 is an exploded perspective view showing the frame and lens parts of a pair of eyeglasses according to the invention.
Figure 2:
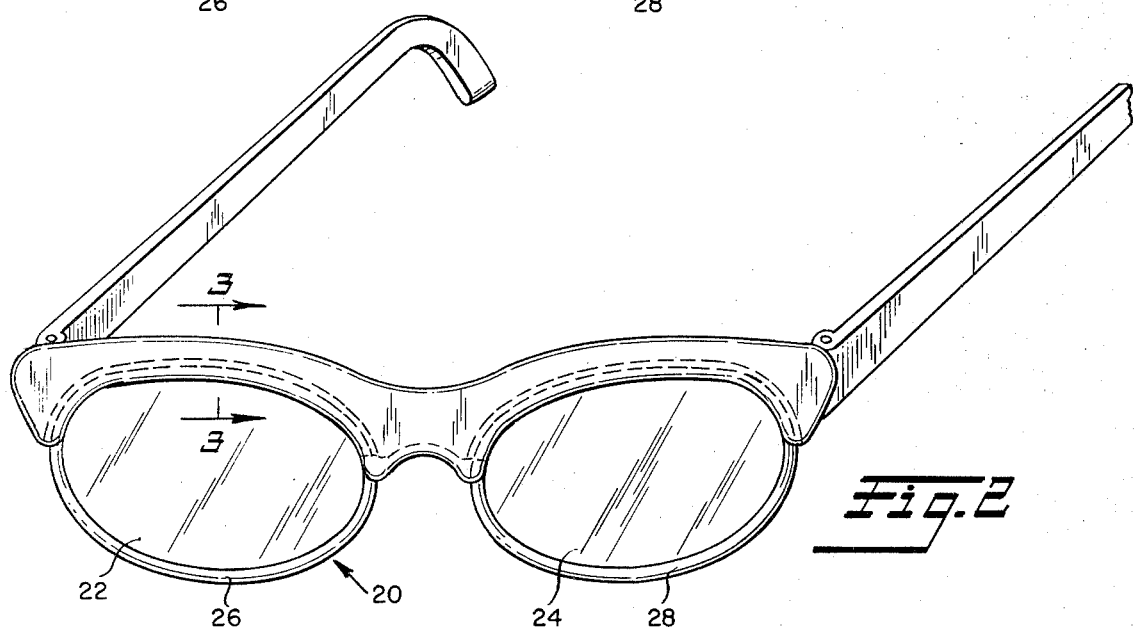
FIG. 2 is a perspective view of the parts shown in FIG. 1 in assembled relation.
Figure 3:
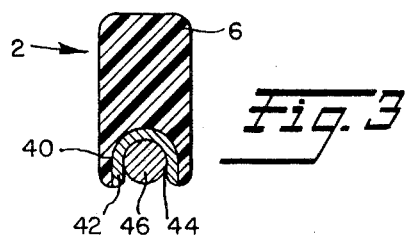
FIG. 3 is a sectional view taken on line 3—3 of FIG. 2.

In accordance with the invention, I provide an eyeglass frame part denoted generally by the numeral 2 having a centrally disposed nose bridge part 4, eyebrow parts 6, 8 and folding temples 10, 12 each of which is pivotally connected at its one end to the outer end of one of the eyebrow parts. This frame part is adapted and intended to be selectively and releaseably connected to one of any number of lens parts, one of which is shown in FIGS. 1 to 3 and all of which are designated generally by numeral 20. This lens part comprises the two transparent lenses 22, 24 each of which is surrounded by a rim 26, or 28, the two rims being connected by a nose bridge part 30. Any number of these lens parts may be provided for selective releaseable connection to the single frame part 2 to provide any desired correction to the eyesight of the user.

Means are provided by the invention for releaseably connecting any one of the lens parts 20 to the frame 2. Such means comprise, first, a downwardly opening groove 40 formed in the lower edge of the nose bridge and eyebrow parts 4, 6, 8 of the frame 2 and, secondly, a lining 42 within and extending along the groove and which is transversely curved to form a downwardly opening groove 44 extending along the lower edge of the nose bridge part and the two eyebrow parts of the frame 2. The upper parts 46, 48 of the rims 26, 28 and the nose bridge part 30 of the lens part 20 are shaped similarly to the groove 44 in the frame part 2 formed by the insert 42, and these rim parts 46, 48 may therefore be snugly received within the groove 44 from end to end thereof. In accordance with the invention either the insert 42 or the rim parts 46, 48 is formed of magnetic material, such as magnetized iron or steel, and the other is formed of a material which will be attracted to, and held by, the magnetic material. In the embodiment disclosed in FIGS. 1 to 3 of the drawings the groove insert 42 is formed of magnetized ferrous material and the rim parts 46, 48 are formed of ferrous material, while the remainder of each rim is formed of some suitable material such as a synthetic plastic. Obviously, the entire lens rims 26, 28 and the nose bridge part 30 of the lens part 20 may be formed of ferrous material instead of only the parts 46, 48 thereof and, equally obviously, the parts 26, 28 or 46, 48 of the lens part 20 may be magnetized and the groove insert 42 may be formed of ferrous material.

No means other than those providing magnetic attraction and the resulting releaseably connection are required for satisfactory connection of the frame and lens, as described. However, the invention also provides means for releaseably locking the frame and lens parts together in the relation and position in which they are held by the magnetic means, and devices for providing this locking function are disclosed in FIGS. 4 to 7.

Figure 4:
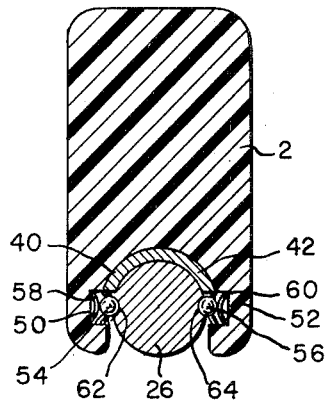
FIGS. 4 and 5 are, respectively, cross sectional views similar to FIG. 3 showing second and third embodiments of the invention including means for locking together the parts of the eyeglasses.

In the locking device shown in FIG. 4 the groove in each of the eyebrow parts of the frame 2 is provided with two opposite, facing recesses 50, 52 within each of which there is held a ball detent 54, 56 which is constantly urged toward the center of the groove by resilient means 58, 60. The lateral sides of the corresponding parts of the lens frame 26 are formed with recesses 62, 64 and when the lens frame is pushed into the grooved insert 42 the balls snap into these recesses to releaseably lock the parts together.

Figure 5:
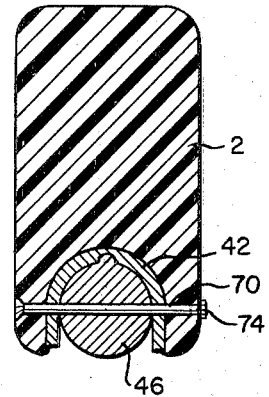

In the form of invention shown in FIG. 5 the locking means takes the form of a pin 70 which is adapted and intended to be pushed through aligned openings extending in a generally horizontal direction through each eyebrow part of the frame, the grooved insert 42 and the rim 26 of each lens. Means 74 are provided at one end of the pin by which it may be extracted from locking position when it is desired to separate a lens part from the frame part.

Figure 6:
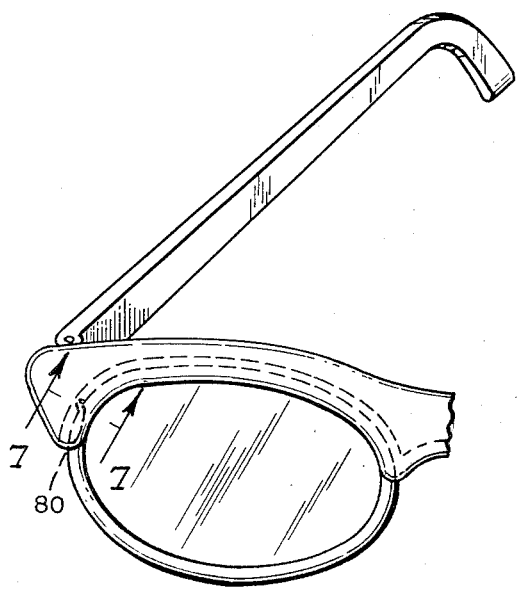
FIG. 6 is a partial view of a pair of eyeglasses showing a further embodiment of the invention.
Figure 7:
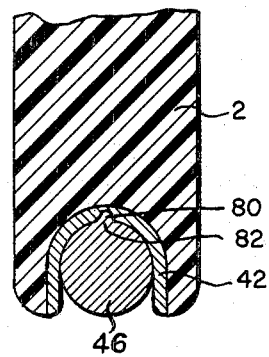
FIG. 7 is a sectional view taken on line 7—7 of FIG. 6.

A third form which the releaseable locking means may take is disclosed in FIGS. 6 and 7 and comprises a generally horizontally extending notch 80 formed in the inner wall of each grooved insert 42 in the frame member 2 and a correspondingly positioned and shaped projection 82 which snaps into the notch when the lens part is inserted into the frame part in the manner described.

I claim:

1. A two-part eyeglass assembly comprising a frame part consisting of two eyebrow parts connected by a nose bridge part, at least the eyebrow parts having a downwardly opening groove therein, a lens part having two lenses each of which has a rim part along at least the upper edge thereof which is positioned within the groove in an eyebrow part and is formed of magnetizable material, and magnetic means within each groove releasably holding the frame and lens parts in assembled relation.

2. The eyeglass assembly according to claim 1, in which the magnetic means comprise an insert formed of magnetized material in each groove and extending along the length thereof and shaped to provide a downwardly opening groove.

3. The eyeglass assembly according to claim 2, in which the upper part of each lens rim is formed of ferrous material and the remaining part thereof is formed of non-ferrous material.

4. The eyeglass assembly according to claim 1 comprising, in addition, means for releasably locking the frame part to the lens part while the parts are magnetically connected, comprising ball detents resiliently supported in the frame, and recesses in each lens rim to cooperate with the ball detents.

5. The eyeglass assembly according to claim 1 comprising, in addition, means for releasably locking the frame part to the lens part while the parts are magnetically connected, comprising aligned passages through the frame part and each lens rim, and a pin slidably and releasably extending through each passage.

6. The eyeglass assembly according to claim 1, comprising, in addition, means for releasably locking the frame part to the lens part while the parts are magnetically connected, comprising a notch in each eyebrow part of the frame, and a projection on each lens rim which is positioned and shaped to be received within the notch.

* * * * *